(12) United States Patent
Park

(10) Patent No.: US 11,851,071 B2
(45) Date of Patent: Dec. 26, 2023

(54) SYSTEM FOR CONTROLLING VEHICLES USING DISTRIBUTED CLOUD COMPUTING

(71) Applicants: Hyundai Motor Company, Seoul (KR); Kia Motors Corporation, Seoul (KR)

(72) Inventor: Hyun Soo Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 17/099,148

(22) Filed: Nov. 16, 2020

(65) Prior Publication Data

US 2021/0362731 A1 Nov. 25, 2021

(30) Foreign Application Priority Data

May 21, 2020 (KR) .................. 10-2020-0061116

(51) Int. Cl.
*B60W 40/00* (2006.01)
*B60W 40/12* (2012.01)
(Continued)

(52) U.S. Cl.
CPC ............ *B60W 40/12* (2013.01); *B60W 40/09* (2013.01); *G06F 9/5072* (2013.01); *G06F 17/18* (2013.01);
(Continued)

(58) Field of Classification Search
CPC .. B60W 40/12; B60W 40/09; B60W 2556/15; B60W 2556/45; G06F 9/5072; H04L 67/12
See application file for complete search history.

(56) References Cited

U.S. PATENT DOCUMENTS

| 5,487,002 A | 1/1996 | Diller et al. |
| 10,031,188 B2 | 7/2018 | Lee et al. |

(Continued)

FOREIGN PATENT DOCUMENTS

| CN | 112349975 A | * 3/2020 | ............ H01M 10/42 |
| EP | 1604341 A1 | 12/2005 | |

(Continued)

OTHER PUBLICATIONS

M. Salahuddin, "Software-Defined Networking for RSU Clouds in Support of the Internet of Vehicles", 2015, IEEE Internet of Things Journal, vol. 2, No. 2 (Year: 2015).*

(Continued)

*Primary Examiner* — Russell Frejd
*Assistant Examiner* — Brittany Renee Peko
(74) *Attorney, Agent, or Firm* — Fox Rothschild LLP

(57) ABSTRACT

A system for controlling vehicles using distributed cloud computing is provided. The system includes a first layer cloud server for collecting vehicle status data generated in a vehicle from the vehicle in real time and processing the collected data in real time. A second layer cloud server receives the vehicle status data generated in the vehicle, data collected by the first layer cloud server or data processed in the first layer cloud server, processes the received data, stores the processed data, and provides the stored data to the vehicle directly or via the first layer cloud server.

16 Claims, 6 Drawing Sheets

(51) Int. Cl.
*B60W 40/09* (2012.01)
*G06F 9/50* (2006.01)
*G06F 17/18* (2006.01)
*H04L 67/12* (2022.01)

(52) U.S. Cl.
CPC ......... *H04L 67/12* (2013.01); *B60W 2556/15* (2020.02); *B60W 2556/45* (2020.02)

(56) References Cited

U.S. PATENT DOCUMENTS

| | | | |
|---|---|---|---|
| 11,445,362 B2* | 9/2022 | Liu | H04W 12/009 |
| 2005/0274553 A1 | 12/2005 | Salman et al. | |
| 2013/0030630 A1 | 1/2013 | Luke et al. | |
| 2013/0073507 A1 | 3/2013 | Sera | |
| 2014/0236403 A1 | 8/2014 | Liu et al. | |
| 2015/0120225 A1 | 4/2015 | Kim | |
| 2016/0202323 A1 | 7/2016 | Lee et al. | |
| 2016/0297416 A1 | 10/2016 | Geller | |
| 2017/0067750 A1* | 3/2017 | Day | G01C 21/3605 |
| 2018/0056807 A1 | 3/2018 | Park et al. | |
| 2018/0123185 A1 | 5/2018 | Kim et al. | |
| 2018/0257473 A1 | 9/2018 | Follen et al. | |
| 2018/0329935 A1 | 11/2018 | Mugali et al. | |
| 2019/0132709 A1 | 5/2019 | Graefe et al. | |
| 2020/0013244 A1 | 1/2020 | Rosenbaum | |
| 2020/0070679 A1 | 3/2020 | Wang et al. | |
| 2020/0077240 A1* | 3/2020 | Bansal | H04W 4/44 |
| 2020/0092396 A1 | 3/2020 | Wu et al. | |
| 2020/0127980 A1 | 4/2020 | Smith et al. | |
| 2020/0137351 A1 | 4/2020 | Bai et al. | |
| 2020/0307621 A1 | 10/2020 | Ostrowski et al. | |
| 2021/0094435 A1 | 4/2021 | Rechkemmer et al. | |
| 2021/0175732 A1* | 6/2021 | Matsuda | H02J 7/00 |
| 2022/0026492 A1 | 1/2022 | Verheijen et al. | |
| 2022/0109726 A1* | 4/2022 | Katata | H04L 67/12 |
| 2022/0266719 A1 | 8/2022 | Iida et al. | |
| 2022/0281345 A1 | 9/2022 | Kim et al. | |
| 2023/0105038 A1* | 4/2023 | Liu | B60W 50/10 |

FOREIGN PATENT DOCUMENTS

| | | |
|---|---|---|
| KR | 2015-0042566 A | 4/2015 |
| KR | 20180116914 A | 10/2018 |
| KR | 20190100114 A | 8/2019 |
| KR | 2019-0122298 A | 10/2019 |
| KR | 20200040576 A | 4/2020 |
| WO | 2019196094 A1 | 10/2019 |

OTHER PUBLICATIONS

M. Shengdong, "Intelligent Traffic Control System Based on Cloud Computing and Big Data Mining", 2019, IEEE Transactions on Industrial Informatics, vol. 15, No. 12 (Year: 2019).*

W. Menghua, "A Real-time Android-based Monitoring System for the Power Lithium-ion Battery Used on EVs", 2017 (Year: 2017).*

Extended European Search Report issued in European Application No. 20206929.0, dated May 7, 2021, 12 pages.

Extended European Search Report issued in European Application No. 20208946.2, dated Jun. 2, 2021, 8 pages.

Farmann et al. (Oct. 2016) "A Comprehensive Review of On-board State-of-Available-Power Prediction Techniques for Lithium-ion Batteries in Electric Vehicles", Journal of Power Sources, 329:123-137.

Taylor Christine (Jun. 8, 2017) "Big Data Architecture: Datamation", 9 pages.

Office Action dated Dec. 20, 2022 in U.S. Appl. No. 17/099,260.

Office Action dated Oct. 26, 2022 in U.S. Appl. No. 16/995,516.

Notice of Allowance dated Jun. 20, 2023 in U.S. Appl. No. 17/099,260.

Office Action dated Jul. 25, 2023 in U.S. Appl. No. 17/027,055.

* cited by examiner

<Set 1>

| Division | Controller |
|---|---|
| 1 | EMS |
| 2 | TCU |
| 3 | HCU |
| 4 | BMS |
| 5 | IBS |
| 6 | LDC |
| 7 | OBC |
| …… | …… |

<Set 2>

| Division | data set 1 |
|---|---|
| 1 | rpm |
| 2 | Torque |
| 3 | Temperature |
| 4 | Voltage |
| 5 | SOC |
| 6 | Power |
| 7 | Vehicle speed |
| …… | …… |

<Set 3>

| Division | data set 2 |
|---|---|
| 1 | Travel time |
| 2 | Average |
| 3 | Maximum value |
| 4 | Minimum value |
| 5 | Slope |
| 6 | Standard deviation |
| 7 | Maximum deviation |
| 8 | Mileage |
| 9 | Cumulative |
| …… | …… |

<Set 4>

| Division | data set 3 |
|---|---|
| 1 | Specific date |
| 2 | Month |
| 3 | Year |
| …… | …… |

<Set 5>

| Division | data set 4 |
|---|---|
| 1 | SOH |
| 2 | Driving pattern1 |
| 3 | Driving pattern2 |
| 4 | Driving pattern3 |
| …… | …… |
| 10 | Output pattern1 |
| 11 | Output pattern2 |
| 12 | Output pattern3 |
| …… | …… |
| 21 | Acceleration pattern1 |
| 22 | Acceleration pattern2 |
| …… | …… |

FIG. 2

SYSTEM FOR CONTROLLING VEHICLES USING DISTRIBUTED CLOUD COMPUTING

CROSS-REFERENCE TO THE RELATED APPLICATION

This application claims priority from Korean Patent Application No. 10-2020-0061116, filed on May 21, 2020, the disclosure of which is incorporated herein by reference in its entirety.

BACKGROUND

1. Field of the Disclosure

The present disclosure relates to a system for controlling vehicles using distributed cloud computing, and more specifically, a system for controlling vehicles using distributed cloud computing, which operates vehicles more efficiently through data communication with the vehicles by configuring a cloud server in a multilayered structure and managing data by layers according to temporality of the data and whether the data has been processed.

2. Description of the Related Art

In recent cloud technology related to vehicles, a cloud server receives various types of status information or control information of a vehicle from the vehicle and stores the received information, and data necessary for performance improvement or development of the vehicle is derived by analyzing information stored in the cloud server for a predetermined period. Such conventional cloud technology related to vehicles simply receives various types of data from vehicles and stores the received data, and thus stored data may become unnecessary for actual vehicle performance improvement or development after data collection, resulting in waste of resources such as storage space. Furthermore, the method of analyzing data stored for a predetermined period (e.g., 2 to 3 years) and reflecting the analyzed data in vehicle performance improvement or development cannot keep pace with rapid technological development.

It will be understood that the above matters described in the related art are merely for promotion of understanding of the background of the disclosure and should not be recognized as prior art well-known to those skilled in the art.

SUMMARY

Therefore, the present disclosure provides a system for controlling vehicles using distributed cloud computing, which may store data provided from a vehicle, operate a vehicle in real time using data provided from the vehicle, process and store data provided from a vehicle, and operate the vehicle using the stored data by configuring a cloud server for vehicles in a multilayered structure, distributing data provided from vehicles to respective layers and managing the data according to temporality of the data and whether the data has been processed.

In accordance with an aspect of the present disclosure, the above and other objects may be accomplished by the provision of a system for controlling vehicles using distributed cloud computing that may include: a first layer cloud server configured to collect vehicle status data generated in a vehicle from the vehicle in real time and process the collected data in real time; and a second layer cloud server configured to receive the vehicle status data generated in the vehicle, data collected by the first layer cloud server or data processed in the first layer cloud server, process the received data, store the processed data, and provide the stored data to the vehicle directly or via the first layer cloud server.

In an exemplary embodiment of the present disclosure, the first layer cloud server may be configured to limit a number of pieces of data that may be stored per vehicle. The vehicle status data collected by the first layer cloud server may include at least some of a temperature, voltage and state of charge (SoC) of a battery, revolutions per minute (rpm), voltage and temperature of a motor, a vehicle speed, an external temperature and an engine rpm of the vehicle. In addition, the second layer cloud server may be configured to process the data after a predetermined time delay from when the vehicle status data generated in the vehicle, data collected by the first layer cloud server or data processed in the first layer cloud server is received.

The second layer cloud server may be configured to calculate at least some of an average, a maximum/minimum value, RMS and a standard deviation of the received data. In addition, the second layer cloud server may be configured to store data obtained by processing the received data along with a generation date or time information of data used to process the processed data. In an exemplary embodiment of the present disclosure, the system may further include a third layer cloud server configured to additionally process the data processed in the second layer cloud server to generate data with respect to analysis of a behavior of the data processed in the second layer cloud server and store the generated data.

The third layer cloud server may be configured to additionally process the data processed by the second layer cloud server to generate at least some of a driving pattern, a power pattern, an acceleration pattern, a degree of battery deterioration, cooling performance, and potential failure prediction values. In addition, the data stored in the first layer cloud server and the second layer cloud server may be stored in the form of a data set, and in the data set, division numbers and data corresponding to each division number may be standardized in advance.

In particular, the data stored in the third layer cloud server may be stored in the form of a data set, and in the data set, division numbers and data corresponding to each division number may be standardized in advance. In addition, the vehicle may be configured to transmit a trigger signal including a type of requested data and information regarding a reception point of the requested data to the first layer cloud server, and the first layer cloud server may be configured to transmit requested data collected at a point at which the trigger signal is transmitted to the vehicle when the vehicle arrives at the reception point.

In an exemplary embodiment of the present disclosure, the vehicle may be configured to sequentially transmit first and second trigger signals including a type of requested data and information regarding a reception point of the requested data to the first layer cloud server, and the first layer cloud server may be configured to transmit requested data collected between a point at which the first trigger signal is transmitted and a point at which the second trigger signal is transmitted to the vehicle when the vehicle arrives at the reception point.

Further, a plurality of first layer cloud servers may be provided, each first layer cloud server having a communication area in which communication with the vehicle may be performed, the vehicle may be configured to communicate with the first layer cloud server having a communication area to which the vehicle belongs during traveling to transmit real-time data to the first layer cloud server, and the second layer cloud server may be configured to collect and process real-time data received by the plurality of first layer cloud servers from the vehicle.

In addition, a plurality of first layer cloud servers may be provided, each first layer cloud server having a communication area in which communication with the vehicle may be performed, the vehicle may be configured to communicate with the first layer cloud server having a communication area to which the vehicle belongs during traveling to transmit real-time data to the first layer cloud server. A plurality of second layer cloud servers respectively communicating with some of the plurality of first layer cloud servers may be provided, each second layer cloud server may be configured to collect real-time data received by the first layer cloud server communicating with the second layer cloud server from the vehicle, and the third layer cloud server may be configured to collect data collected by the plurality of second layer cloud servers.

In accordance with another aspect of the present disclosure, the above and other objects may be accomplished by the provision of a system for controlling vehicles using distributed cloud computing, which has multiple layers each having a cloud server, wherein a cloud server belonging to a lowest layer of the multiple layers communicates with a vehicle, collects and processes vehicle data generated in the vehicle in real time, and provides the collected data and the processed data to the vehicle, and a cloud server belonging to a higher layer than the lowest layer processes and stores data provided from the lower layer and communicates with the vehicle or the cloud server belonging to the lower layer to transmit the processed data to the vehicle directly or via the cloud server belonging to the lower layer.

In an exemplary embodiment of the present disclosure, data stored in the cloud servers belonging to the multiple layers may be stored in the form of a data set, and in the data set, division numbers and data corresponding to each division number may be standardized in advance. In addition, a plurality of cloud servers belonging to the lowest layer may be provided, each cloud server belonging to the lowest layer may have a communication area in which communication with the vehicle may be performed, the vehicle may be configured to communicate with a cloud server of the lowest layer having a communication area to which the vehicle belongs during traveling to transmit real-time data to the cloud server of the lowest layer, and the cloud server belonging to the higher layer may be configured to receive the real-time data or data corresponding to collection of the real-time data from the plurality of cloud servers belonging to the lower layer and process the received data.

According to the system and method for controlling vehicles using distributed cloud computing, it may be possible to operate a vehicle that is traveling in real time and enable autonomous driving control of a vehicle by distributing real-time data and various types of information required for vehicle control, which may be derived by processing real-time data, to respective layers, calculating and storing the data and information beyond simple collection and storage of real-time data of vehicles.

It will be appreciated by persons skilled in the art that the effects that may be achieved with the present disclosure are not limited to what has been particularly described hereinabove and other advantages of the present disclosure will be more clearly understood from the following detailed description.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is a diagram illustrating an example of data sets stored in a cloud server of the system for controlling vehicles using distributed cloud computing according to an exemplary embodiment of the present disclosure;

DETAILED DESCRIPTION

Figure 1:
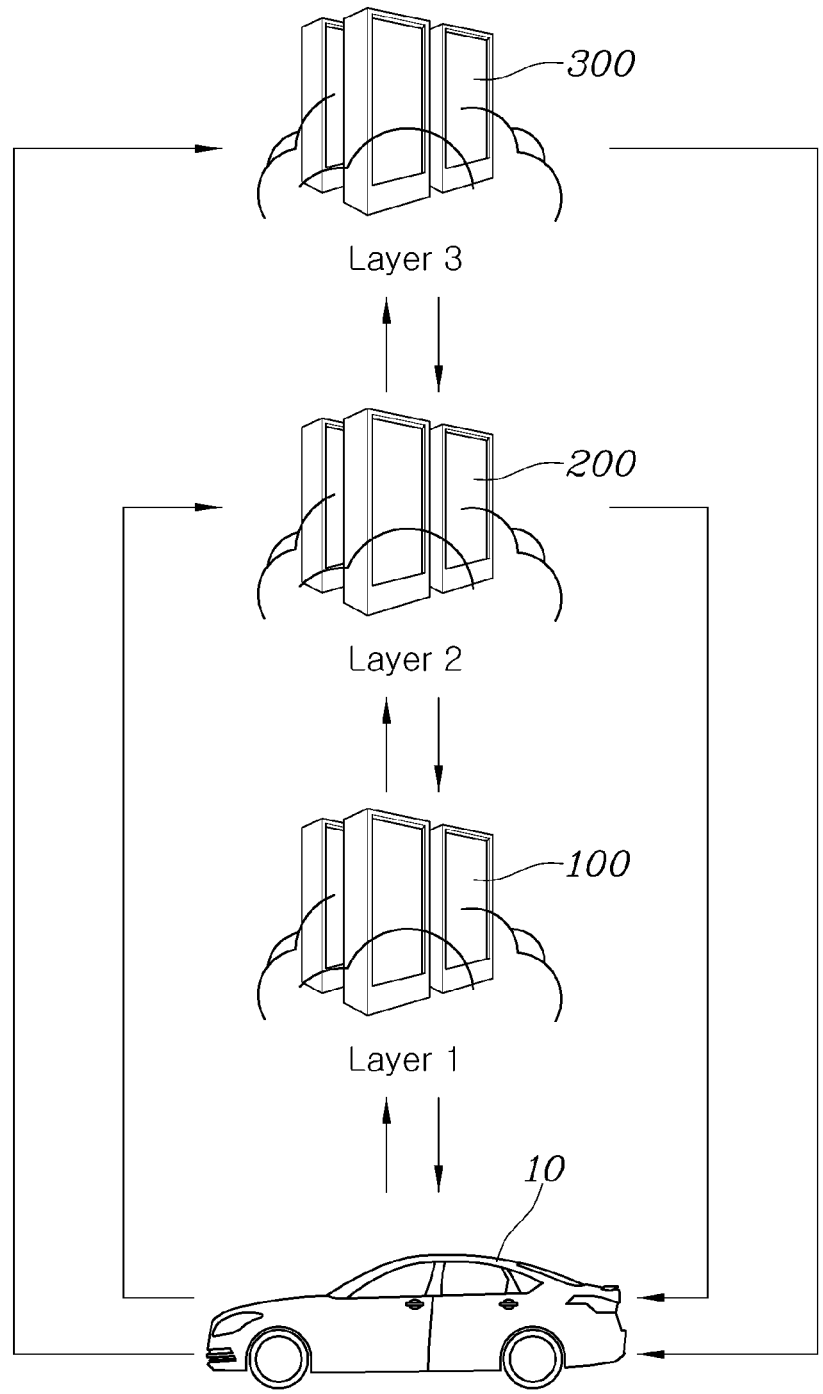
FIG. 1 is a configuration diagram illustrating a system for controlling vehicles using distributed cloud computing according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a system and method for controlling vehicles using distributed cloud computing according to various exemplary embodiments of the present disclosure will be described in detail with reference to the attached drawings.

FIG. 1 is a configuration diagram illustrating a system for controlling vehicles using distributed cloud computing according to an exemplary embodiment of the present disclosure. Referring to FIG. 1, a system for controlling vehicles using distributed cloud computing according to an exemplary embodiment of the present disclosure has a multilayered structure and may include cloud servers 100, 200 and 300 at respective layers. The cloud server 100 belonging to the lowest layer of the multilayered structure may be configured to communicate with a vehicle 100, collect vehicle status data generated in the vehicle 10 in real time and provide the collected data to the vehicle, and the cloud servers 200 and 300 belonging to higher layers than the lowest layer may be configured to process and store data provided from lower layers and communicate with the vehicle 10 to transmit the processed data to the vehicle 10.

FIG. 1 illustrates an exemplary embodiment in which three layers are provided, and the number of layers may be appropriately adjusted as necessary. According to the exemplary embodiment illustrated in FIG. 1, the system for controlling vehicles may include the first layer cloud server 100 configured to communicate with the vehicle 10 and collect vehicle status data generated in the vehicle in real time, and the second cloud server 200 configured to process data collected in the first layer cloud server 100 and provide the processed data to the vehicle 10.

The first layer cloud server 100 may be configured to collect raw data generated in the vehicle in real time via communication with the vehicle. The first layer cloud server 100 may be configured to collect and store vehicle data without data loss at as short a sampling rate as possible. Further, the number of pieces of data that may be collected and stored per vehicle communicating with the first layer cloud server 100 may be limited for the first layer cloud server 100. Although all data collected from vehicles may be stored if resources permit, the first layer cloud server 100 mostly operates vehicles by communicating with the vehicles in real time, and thus it is desirable to limit the number of pieces of data that may be stored per vehicle for efficient use of resources.

Raw data collected by the first layer cloud server 100 is data generated in and transmitted from various controllers of a vehicle and may be, for example, a temperature, SoC and voltage of a battery, rpm, a voltage and temperature of a motor, a vehicle speed, an external temperature, engine rpm, and the like of the vehicle 10. The vehicle 10 (controller thereof) may be configured to request and receive data stored in the first layer cloud server 100 as necessary.

The second layer cloud server 200 may be configured to primarily process raw data collected by the first layer cloud server 100 to calculate items such as averages, maximum/minimum values, RMS, and standard deviations and store the calculated results. Processed data may be stored and managed in the form of a preset data set. Particularly, data stored in the second layer cloud server 200 may be stored in the form of processed data in a predetermined format instead of raw data and may be stored along with a date of corresponding data, a travel time or the like.

Although the first layer cloud server 100 immediately stores collected raw data, the second layer cloud server 200 that processes collected data need not necessarily process and store row data in real time and a certain degree of delay time from reception of data to processing and storage of the data may be permitted. The vehicle 10 may be configured to request and receive processed data from the second layer cloud server 200 as necessary.

An exemplary embodiment of the present disclosure may further include the third layer cloud server 300. The third layer cloud server 300 may be configured to secondarily process data processed in the second layer cloud server 200. The third layer cloud server 300 can may be configured to data processing that requires calculation capability with higher performance than calculation required for data processing of the second layer cloud server 200. Additionally, the third layer cloud server 300 may be configured to generate and store data such as a driving pattern, a power pattern, an acceleration pattern, a degree of deterioration of a battery, cooling performance, and potential failure prediction using data processed in the second layer cloud server 200.

FIG. 2 is a diagram illustrating an example of data sets stored in a cloud server of the system for controlling vehicles using distributed cloud computing according to an exemplary embodiment of the present disclosure. As illustrated in FIG. 2, data sets stored in the first layer cloud server 100 may be provided as a plurality of tables. A first set is a set of controllers in the vehicle 10 configured to generate data transmitted from the vehicle 10, a second set is a set of raw data generated in the controllers in the vehicle 10, a third set is a data set generated by primarily processing raw data, a fourth set is a set of time setting values used as standards when data is acquired, and a fifth set of a set of results that may be obtained through calculation or determination through logic operations using raw data and primarily processed data.

For example, the first layer cloud server 100 may be configured to store the first set and the second set of FIG. 2, the second layer cloud server 200 may be configured to store the third be configured to set and the fourth set, and the third layer cloud server 300 may be configured to store the fifth set. When the first layer cloud server 100 stores processed data that may be calculated in real time, the third set may be stored in the first layer cloud server 100. It is desirable that these data sets be standardized such that they are freely and conveniently accessible by the vehicle 10 only upon security access authentication. For example, if division numbers of each set and information corresponding to the division numbers illustrated in FIG. 2 are standardized, the vehicle 10 and the cloud servers 100, 200 and 300 may be configured to request data and transmit requested data rapidly and conveniently without additional data search.

Figure 3:
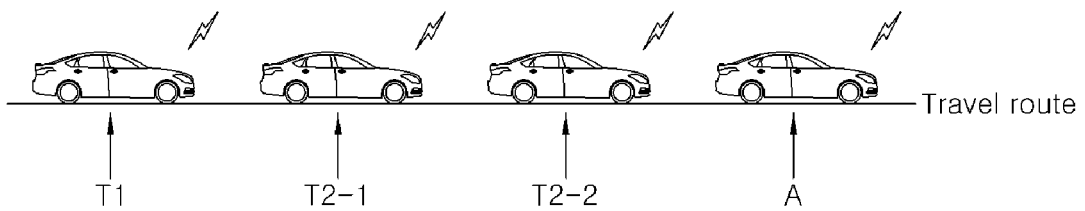
FIG. 3 is a diagram for describing an example of a method for communication between a vehicle and a first layer cloud server in the system for controlling vehicles using distributed cloud computing according to an exemplary embodiment of the present disclosure.

FIG. 3 is a diagram for describing an example of a method for communication between a vehicle and the first layer cloud server in the system for controlling vehicles using distributed cloud computing according to an exemplary embodiment of the present disclosure. As illustrated in FIG. 3, a vehicle may be configured to transmit a trigger signal to the first layer cloud server 100 at a point T1 while the vehicle is being driven. The trigger signal may include the type of requested data and information about a reception point. The first layer cloud server 100 may be configured to transmit requested data collected at the trigger signal transmission point to the vehicle 10 when the vehicle arrives at the reception point.

For example, when the vehicle 10 requests voltage information (item #4 of the first set and item #4 of the second set) of a battery management system (BMS) at the point T1 and transmits a trigger signal that designates T3 as a reception point to the first layer cloud server 100, the first layer cloud server 100 may be configured to transmit voltage information of the BMS collected at the point T1 to the vehicle 10 when the vehicle arrives at the point T3.

As another example, when the vehicle 10 requests an average of vehicle speeds (item #2 of the first set, item #7 of the second set and item #2 of the third set) at points T2-1 and T2-2 and transmits a trigger signal that designates T3 as a reception point to the first layer cloud server 100, the first layer cloud server 100 may be configured to transmit an average of speeds of the vehicle 10 that has traveled from the point T2-1 to the point T2-2, calculated based on vehicle speed information of the vehicle 10 collected between the point T2-1 and the point T2-2, to the vehicle 10 when the vehicle arrives at the point T3. In particular, position information of the vehicle 10 may be derived through a navigation system included in the vehicle 10 and the first layer cloud server 100 may be configured to collect data from the vehicle 10 along with the position information.

Figure 4:
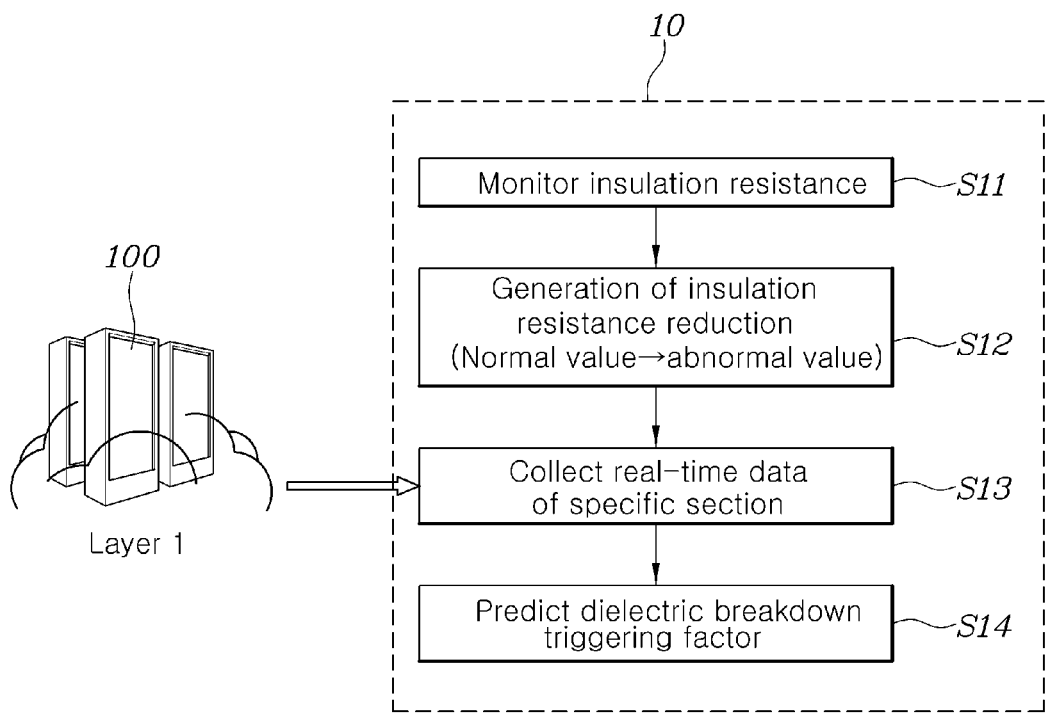
FIG. 4 is a diagram for describing an example of application of vehicle control through communication with the first layer cloud server in the system for controlling vehicles using distributed cloud computing according to an exemplary embodiment of the present disclosure.

FIG. 4 is a diagram for describing an example of application of vehicle control through communication with the first layer cloud server in the system for controlling vehicles using distributed cloud computing according to an exemplary embodiment of the present disclosure. In the example illustrated in FIG. 4, a controller included in a vehicle may be configured to monitor insulation resistance of the vehicle (S11), and when the insulation resistance decreases to be equal to or less than a preset value (S12), request and receive real-time data that affects the insulation resistance of the vehicle, collected by the first layer cloud server 100 in a specific time period, from the first layer cloud server 100.

For example, the vehicle 10 may be configured to request and receive data such as motor rpm (or an average thereof), alternator rpm (or an average thereof), air-conditioner compressor rpm (or an average thereof), power of a high-voltage heater (or variation thereof) or vehicle speeds (or an average thereof) in a specific time period (S13). Subsequently, an algorithm for predicting a prestored dielectric breakdown triggering factor of the vehicle 10 may be executed to predict a dielectric breakdown triggering factor.

Figure 5:
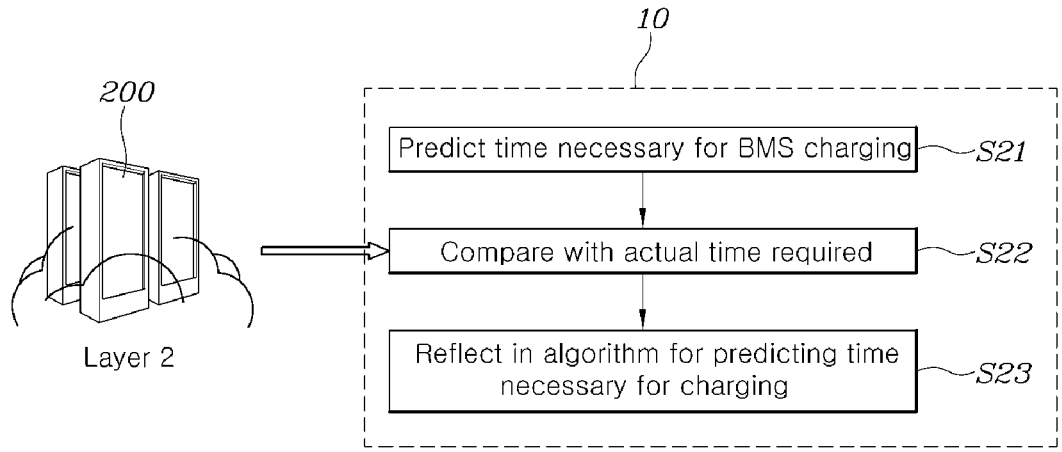
FIG. 5 is a diagram for describing an example of application of vehicle control through communication with a second layer cloud server in the system for controlling vehicles using distributed cloud computing according to an exemplary embodiment of the present disclosure.

FIG. 5 is a diagram for describing an example of application of vehicle control through communication with the second layer cloud server in the system for controlling vehicles using distributed cloud computing according to an exemplary embodiment of the present disclosure. Particularly, the example illustrated in FIG. 5 relates to utilization of data stored in the second layer cloud server to predict a battery charging time of a vehicle.

For example, a controller (e.g., a BMS) included in a vehicle may be configured to predict a time necessary to charge a battery using information that may be collected from the battery (e.g., a state of charge, charging current, etc.) (S21), receive information about a time actually taken for charging of the vehicle from the second layer cloud server 200 and compare the received information with the predicted time necessary for charging (S22). Subsequently, the controller may be configured to reflect the time actually taken for charging which corresponds to an experience point in an algorithm for predicting a time necessary for charging to improve the accuracy of the algorithm.

As another example of using the second layer cloud server 200, when the second layer cloud server 200 is requested to provide an average battery temperature (item #4 of the first set, item #3 of the second set, item #2 of the third set, and item #3 of the fourth set in FIG. 2) measured by the BMS last year while the vehicle is being driven, the second layer cloud server 200 may be configured to calculate a yearly average of battery temperatures using a prestored battery temperature average per trip and provide the calculated yearly average to the vehicle.

As another example, when the vehicle 10 requests maximum power (item #6 of the first set, item #6 of the second set, item #3 of the third set, and item #2 of the fourth set in FIG. 2) of a low voltage DC-DC converter (LDC) last month while the vehicle is being driven, the second layer cloud server 200 may be configured to transmit a maximum value of prestored LDC powers for respective trips to the vehicle 10.

Figure 6:
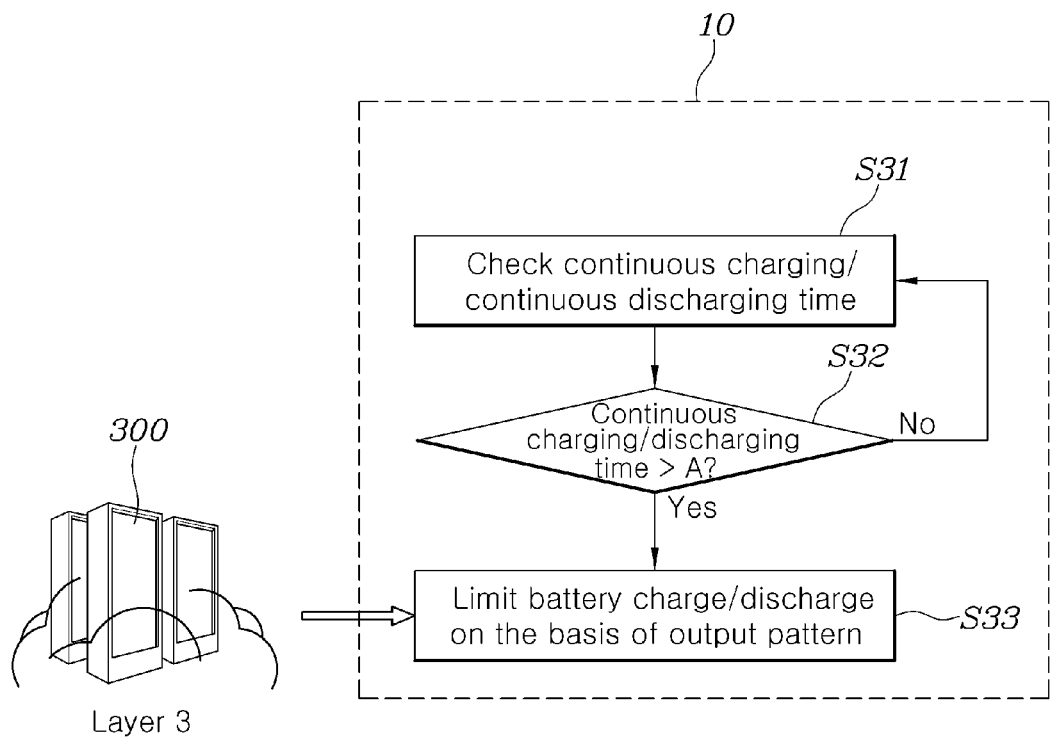
FIG. 6 is a diagram for describing an example of application of vehicle control through communication with a third layer cloud server in the system for controlling vehicles using distributed cloud computing according to an exemplary embodiment of the present disclosure.

FIG. 6 is a diagram for describing an example of application of vehicle control through communication with the third layer cloud server in the system for controlling vehicles using distributed cloud computing according to an exemplary embodiment of the present disclosure. Particularly, the example illustrated in FIG. 6 relates to utilization of data stored in the third layer cloud server to control available power of a battery when the battery is continuously charged or discharged.

For example, after a controller (e.g., a BMS) included in a vehicle checks a time for which a battery is continuously charged or discharged (S31), the controller may be configured to request and receive information regarding a power pattern of the battery from the third layer cloud server 300 when the time for which the battery is continuously charged or discharged is longer than a preset value A (S32). The vehicle 10 may be configured to calculate a factor for limiting the power of the battery based on the information regarding the power pattern received from the third layer cloud server 300 according to a preset algorithm and limit the battery power by applying the factor to the battery power.

Figure 7:
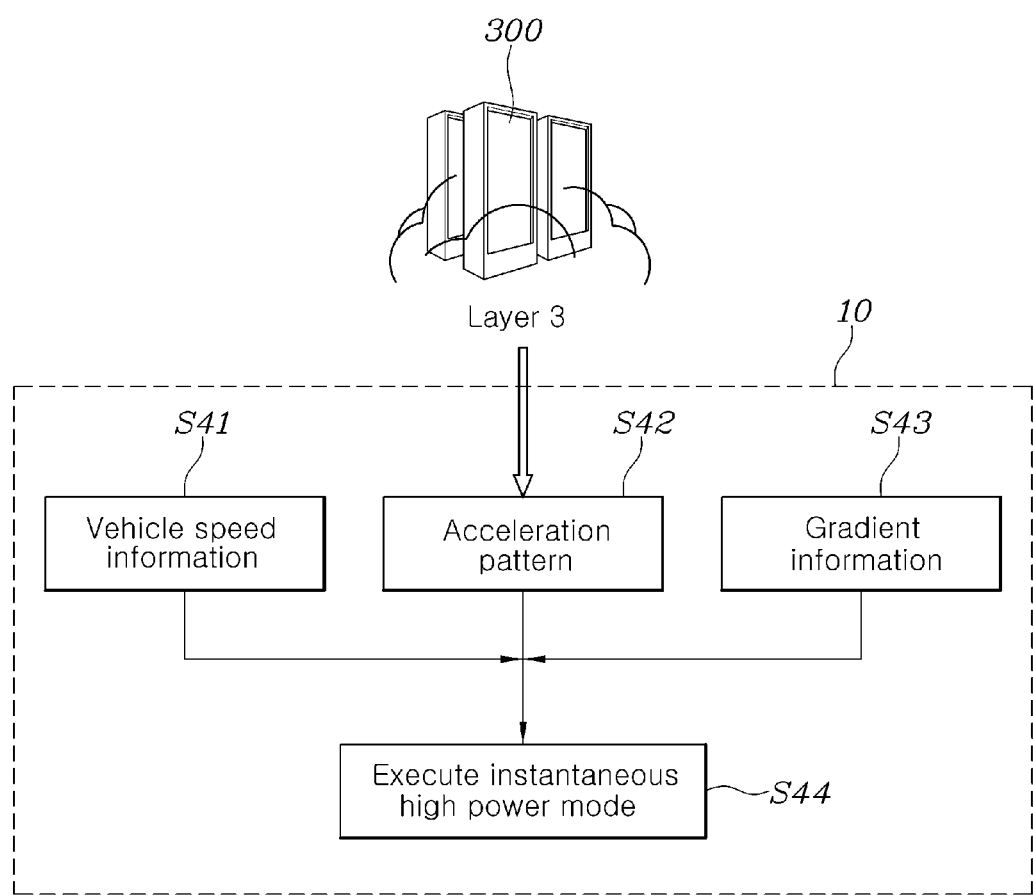
FIG. 7 is a diagram for describing another example of application of vehicle control through communication with the third layer cloud server in the system for controlling vehicles using distributed cloud computing according to an exemplary embodiment of the present disclosure.

FIG. 7 is a diagram for describing another example of application of vehicle control through communication with the third layer cloud server in the system for controlling vehicles using distributed cloud computing according to an exemplary embodiment of the present disclosure. Particularly, the example illustrated in FIG. 7 relates to utilization of data stored in the third layer cloud server to determine whether to apply an instantaneous high power permission mode of a vehicle.

For example, a controller (e.g., a BMS) of a vehicle needs to stop power limitation and permit instantaneous high power when high power is required when the vehicle overtakes or travels on an uphill road although power that may be output from the battery is limited for a reference time in a general driving situation. In particular, the controller may be configured to check vehicle speed information of the vehicle (S41), receive acceleration pattern information of the vehicle from the third layer cloud server 300 (S42), check gradient information of a road on which the vehicle is traveling (S43), and perform calculation for executing an instantaneous high power mode (S44). The acceleration pattern information received from the third layer cloud server 300 may be used to apply a driving pattern (acceleration pattern) of a driver to determination of the level of high power output in the instantaneous high power mode.

Figure 8:
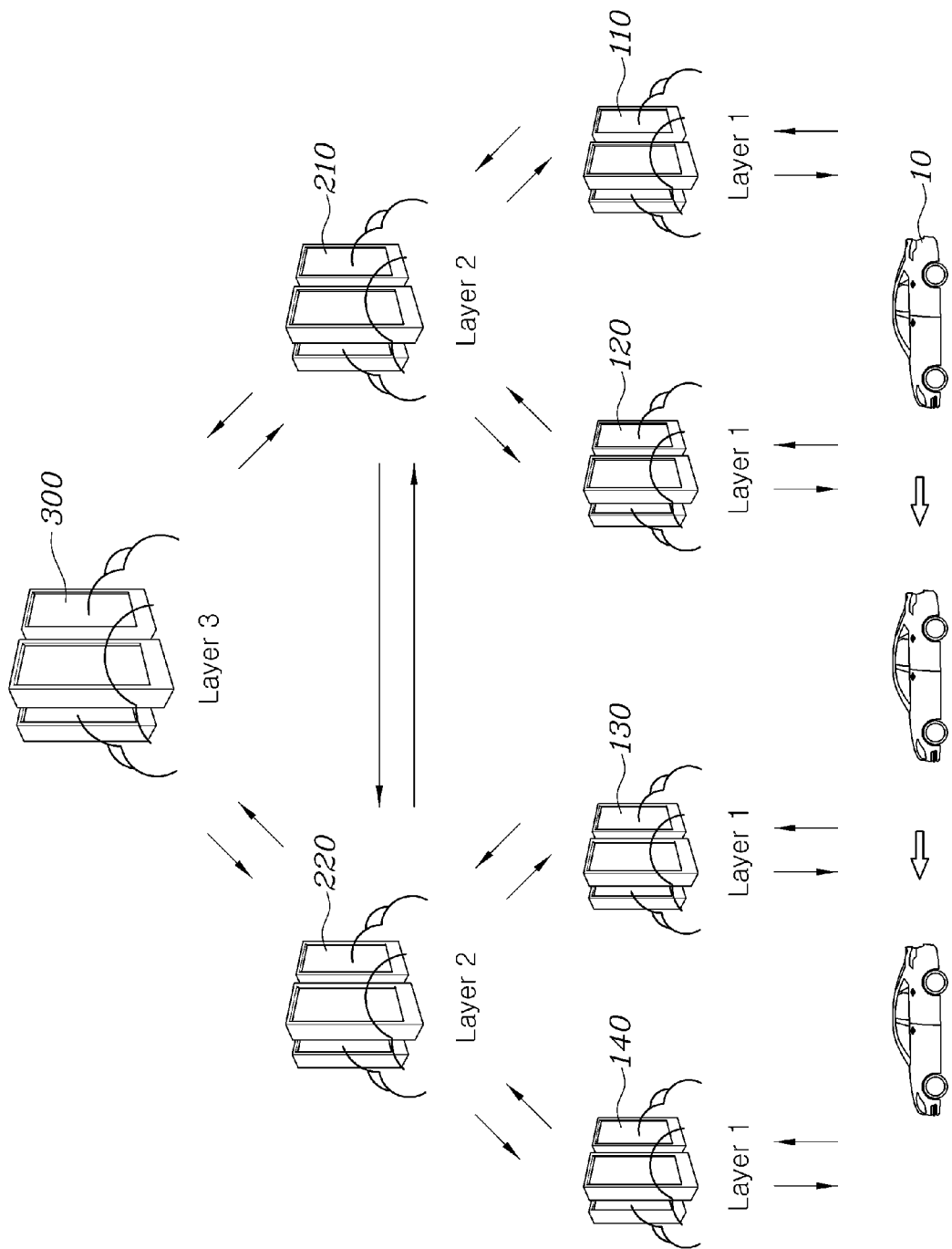
FIG. 8 is a diagram for describing a method for communication between a vehicle and a cloud server in the system for controlling vehicles using distributed cloud computing according to an exemplary embodiment of the present disclosure.

FIG. 8 is a diagram for describing a method for communication between a vehicle and a cloud server in the system for controlling vehicles using distributed cloud computing according to an exemplary embodiment of the present disclosure. Referring to FIG. 8, the vehicle that is traveling may be configured to communicate with the first layer cloud server 100 closest thereto to transmit real-time data to the first layer cloud server 100.

For example, a plurality of first layer cloud servers 100 may be installed at multiple points, and each first layer cloud server 100 has a communication area thereof. When the vehicle 10 passes through the communication areas of the plurality of first layer cloud servers 100, the vehicle 10 may be configured to communicate with a first layer cloud server 100 having a communication area to which the vehicle 10 belongs when communication is necessary to provide vehicle status data in real time.

The second layer cloud server 200 may be configured to collect real-time data collected by the plurality of first layer cloud servers 100 from the vehicle 10, and the third layer cloud server 300 may be configured to collect the data collected by the second layer cloud server 200 to finally collect real-time data of the vehicle 10 and store real-time data received from the vehicle 10 for one trip. In this manner, real-time data may be collected without data loss even when the vehicle is traveling at a high speed.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for controlling vehicles using distributed cloud computing, comprising:
   a first layer cloud server configured to collect vehicle status data generated in a vehicle from the vehicle in real time and process the collected data in real time; and
   a second layer cloud server configured to receive the vehicle status data generated in the vehicle, data collected by the first layer cloud server or data processed in the first layer cloud server, process the received data, store the processed data, and provide the stored data to the vehicle directly or via the first layer cloud server;
   wherein the vehicle is configured to sequentially transmit first and second trigger signals to the first layer cloud server at a first point and a second point, respectively;
   wherein the first and second trigger signals include a type of requested data and information about a reception point of the requested data;
   wherein, when the vehicle arrives at the reception point, the first layer cloud server is configured to transmit requested data collected between the first point and the second point to the vehicle; and
   wherein the requested data is the vehicle status data collected by the first layer cloud server or data obtained by processing the vehicle status data by the first layer cloud server.

2. The system according to claim 1, wherein the first layer cloud server limits a number of pieces of data to be stored per vehicle.

3. The system according to claim 1, wherein the vehicle status data collected by the first layer cloud server includes at least one or more of a temperature, voltage and state of charge (SoC) of a battery, revolutions per minute (rpm), voltage and temperature of a motor, a vehicle speed, an external temperature and an engine rpm of the vehicle.

4. The system according to claim 1, wherein the second layer cloud server is configured to process the data after a predetermined time delay from when the vehicle status data generated in the vehicle, data collected by the first layer cloud server or data processed in the first layer cloud server is received.

5. The system according to claim 1, wherein the second layer cloud server is configured to calculate at least one or more of an average, a maximum/minimum value, RMS and a standard deviation of the received data.

6. The system according to claim 1, wherein the second layer cloud server is configured to store data obtained by processing the received data along with a generation date or time information of data used to process the processed data.

7. The system according to claim 1, further comprising a third layer cloud server configured to additionally process the data processed in the second layer cloud server to generate data with respect to analysis of a behavior of the data processed in the second layer cloud server and storing the generated data.

8. The system according to claim 7, wherein the third layer cloud server is configured to additionally process the data processed by the second layer cloud server to generate at least one or more of a driving pattern, a power pattern, an acceleration pattern, a degree of battery deterioration, cooling performance, and potential failure prediction values.

9. The system according to claim 7, wherein:
   a plurality of first layer cloud servers is provided, each first layer cloud server having a communication area in which communication with the vehicle is possible,
   the vehicle communicates with the first layer cloud server having a communication area to which the vehicle belongs during traveling to transmit real-time data to the first layer cloud server,
   a plurality of second layer cloud servers respectively communicating with some of the plurality of first layer cloud servers, and each second layer cloud server is configured to collect real-time data received by the first layer cloud server communicating with the second layer cloud server from the vehicle, and
   the third layer cloud server is configured to collect data collected by the plurality of second layer cloud servers.

10. The system according to claim 1, wherein the data stored in the first layer cloud server and the second layer cloud server are stored in the form of a data set, and in the data set, division numbers and category of information corresponding to each division number are standardized in advance.

11. The system according to claim 10, wherein the data stored in the third layer cloud server is stored in the form of a data set, and in the data set, division numbers and category of information corresponding to each division number are standardized in advance.

12. The system according to claim 1, wherein the vehicle is configured to transmit a trigger signal including a type of requested data and information about a reception point of the requested data to the first layer cloud server, and the first layer cloud server is configured to transmit requested data collected at a point at which the trigger signal is transmitted to the vehicle when the vehicle arrives at the reception point.

13. The system according to claim 1, wherein:
a plurality of first layer cloud servers is provided, each first layer cloud server having a communication area in which communication with the vehicle is possible,
the vehicle communicates with the first layer cloud server having a communication area to which the vehicle belongs during traveling to transmit real-time data to the first layer cloud server, and
the second layer cloud server is configured to collect and process real-time data received by the plurality of first layer cloud servers from the vehicle.

14. A system for controlling vehicles using distributed cloud computing, which has multiple layers each having a cloud server,
wherein a cloud server belonging to a lowest layer of the multiple layers communicates with a vehicle, collects and processes vehicle data generated in the vehicle in real time, and provides the collected data and the processed data to the vehicle,
wherein a cloud server belonging to a higher layer than the lowest layer processes and stores data provided from the lowest layer and communicates with the vehicle or the cloud server belonging to the lowest layer to transmit the processed data to the vehicle directly or via the cloud server belonging to the lowest layer;
wherein the vehicle is configured to sequentially transmit first and second trigger signals to the cloud server belonging to the lowest layer at a first point and a second point, respectively;
wherein the first and second trigger signals include a type of requested data and information about a reception point of the requested data;
wherein, when the vehicle arrives at the reception point, the cloud server belonging to the lowest layer is configured to transmit requested data collected between the first point and the second point to the vehicle;
wherein the requested data is the vehicle status data collected by the cloud server belonging to the lowest layer or data obtained by processing the vehicle status data by the cloud server belonging to the lowest layer.

15. The system according to claim 14, wherein data stored in the cloud servers belonging to the multiple layers is stored in the form of a data set, and in the data set, division numbers and data corresponding to each division number are standardized in advance.

16. The system according to claim 14, wherein:
a plurality of cloud servers belonging to the lowest layer is provided, and each cloud server belonging to the lowest layer has a communication area in which communication with the vehicle is possible,
the vehicle communicates with a cloud server of the lowest layer having a communication area to which the vehicle belongs during traveling to transmit real-time data to the cloud server of the lowest layer, and
the cloud server belonging to the higher layer is configured to receive the real-time data or data corresponding to collection of the real-time data from the plurality of cloud servers belonging to the lower layer and processes the received data.

* * * * *